(12) United States Patent
Sullivan

(10) Patent No.: US 6,717,590 B1
(45) Date of Patent: Apr. 6, 2004

(54) VERIFIED SCHEDULING OF RECURRENT PROGRAM RECORDING OPERATIONS

(75) Inventor: Gary E. Sullivan, Mansfield, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/316,324

(22) Filed: May 21, 1999

(51) Int. Cl.⁷ .................................................. G09G 5/00
(52) U.S. Cl. .......................................... 345/716; 725/40
(58) Field of Search ................................. 345/716, 762, 345/810, 840; 725/40, 42, 45, 47, 60, 61

(56) References Cited

U.S. PATENT DOCUMENTS

| | | |
|---|---|---|
| 4,115,846 A | 9/1978 | Laine |
| 4,697,209 A | 9/1987 | Kiewit et al. |
| 4,706,121 A | 11/1987 | Young |
| 4,706,121 A | 11/1987 | Young |
| 5,151,789 A | 9/1992 | Young |
| 5,353,121 A | 10/1994 | Young et al. |
| 5,532,754 A | 7/1996 | Young et al. |
| 5,550,576 A | 8/1996 | Klosterman |
| 5,559,548 A | 9/1996 | Davis et al. |
| 5,589,892 A * | 12/1996 | Knee et al. ................ 348/731 |
| 5,629,733 A | 5/1997 | Youman et al. |
| 5,635,978 A | 6/1997 | Alten et al. |
| 5,686,954 A | 11/1997 | Yoshinobu et al. |
| 5,699,107 A | 12/1997 | Lawler et al. |
| 5,732,338 A | 3/1998 | Schwob |
| 5,751,282 A | 5/1998 | Girard et al. |
| 5,751,372 A | 5/1998 | Forson |
| 5,758,257 A | 5/1998 | Herz et al. |
| 5,760,821 A | 6/1998 | Ellis et al. |
| 5,801,753 A | 9/1998 | Eyer et al. |
| 5,801,787 A | 9/1998 | Schein et al. |
| 5,805,204 A | 9/1998 | Thompson et al. |
| 5,805,235 A | 9/1998 | Bedard |
| 6,014,184 A * | 1/2000 | Knee et al. ................ 348/731 |
| 6,026,368 A * | 2/2000 | Brown et al. ................ 705/14 |
| 6,088,722 A * | 7/2000 | Herz et al. ................ 709/217 |
| 6,118,492 A * | 9/2000 | Milnes et al. ................ 348/563 |
| 6,275,268 B1 * | 8/2001 | Ellis et al. ................ 725/60 |
| 6,353,444 B1 * | 3/2002 | Katta et al. ................ 345/716 |
| 6,515,680 B1 * | 2/2003 | Hendricks et al. ......... 345/716 |

\* cited by examiner

*Primary Examiner*—Cao Kevin Nguyen
(74) *Attorney, Agent, or Firm*—Scott Charles Richardson; Chad W. Swantz; Suiter-West

(57) ABSTRACT

A user interface and software for enabling or performing functions on programs contained within program scheduling information. The user selects a program from the program scheduling information, and the system determines if a function can be enabled for the selected program by determining the differences between the recurring periods of the selected program and the function.

15 Claims, 8 Drawing Sheets

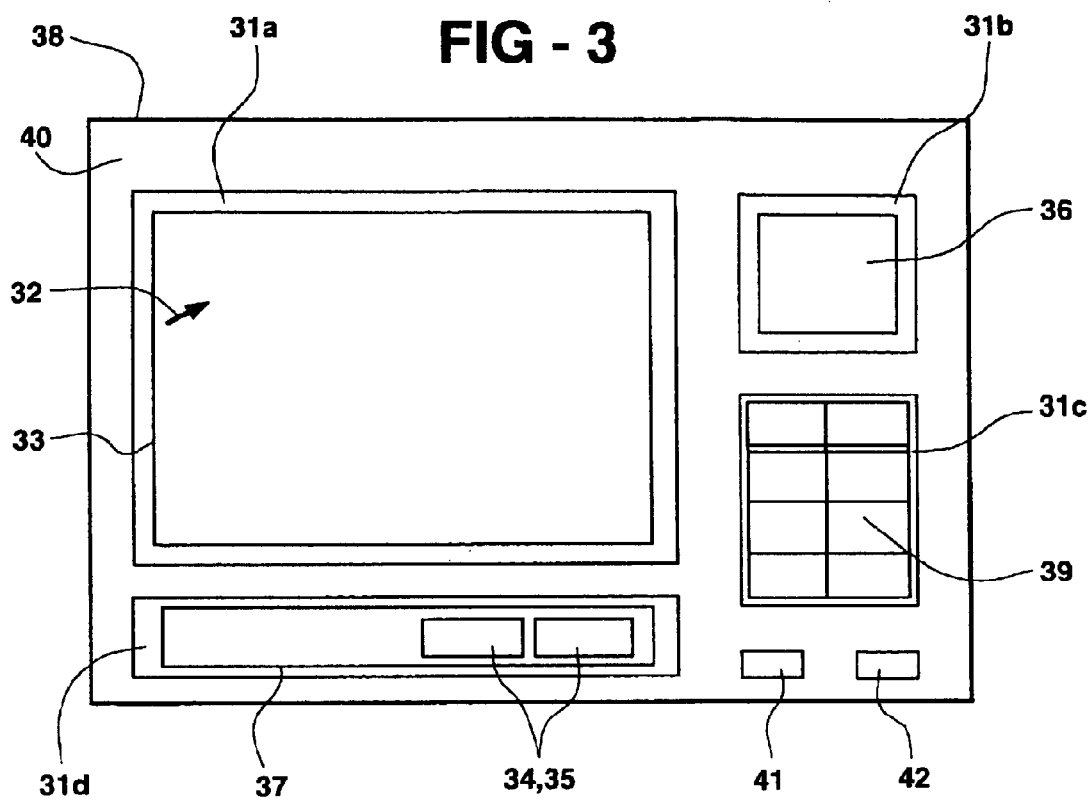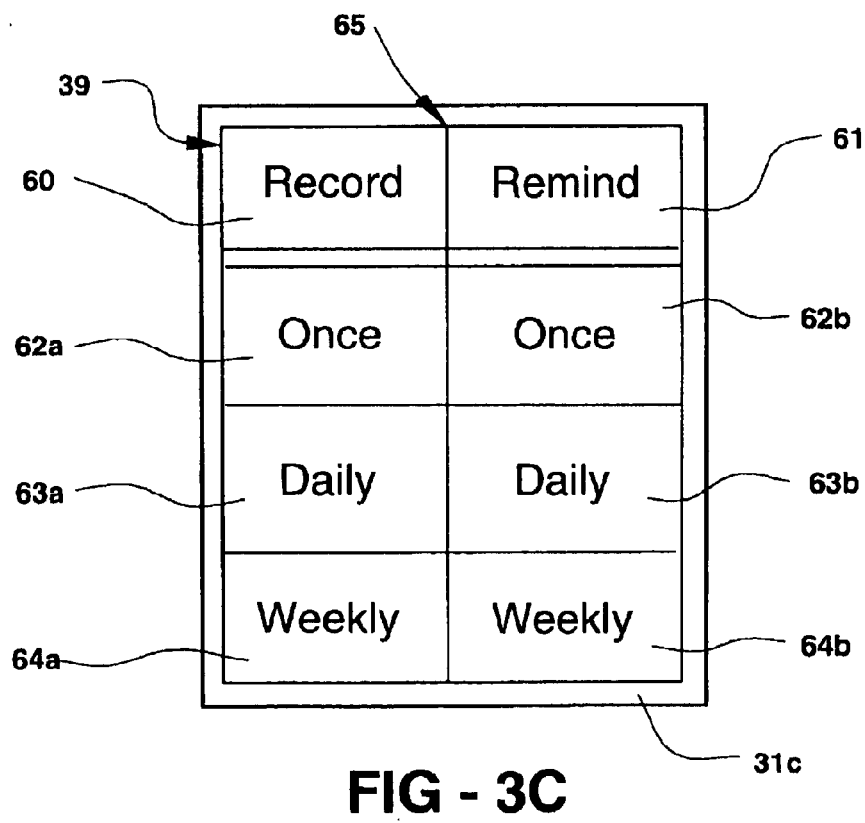

| CHANNEL | NETWORK | PROGRAM NAME | DAY | DATE | START TIME | STOP TIME | RATING | RECURS | EPISODE # | EPISODE DESCRIPTION |
|---|---|---|---|---|---|---|---|---|---|---|
| 2 | NBC | FRAZIER | TUE | 03/18/99 | 20:00 | 22:00 | TVPG | WEEKLY | 990118 | Will Niles regain his condo from... |
| 3 | FOX | SEINFELD | TUE | 03/18/99 | 21:30 | 22:00 | TVPG | DAILY | 856412 | Jerry dates woman with... |
| 4 | CBS | TURKS | TUE | 03/18/99 | 20:00 | 21:00 | TVPG | WEEKLY | 96123 | The son of Mike's neighbor is a... |
| 5 | ESPN | THIS WEEK IN GOLF | TUE | 03/18/99 | 18:00 | 21:00 | N/A | WEEKLY | 678031 | New graphite drivers... |
| 6 | HBO1 | G.I. JANE | TUE | 03/18/99 | 19:00 | 20:30 | R | N/A | 00001 | Female enlists in the navy... |
| 7 | DISCOVERY | POPULAR SCIENCE | TUE | 03/18/99 | 17:00 | 18:00 | TVG | MONTHLY | 00046 | Golf clubs with graphite... |
| ... | ... | ... | ... | ... | ... | ... | ... | ... | ... | ... |
| 2 | ABC | THE HUGHLEYS | WED | 03/19/99 | 18:00 | 18:30 | TVPG | WEEKLY | 24258 | Darryl worries about his son's... |
| 3 | FOX | SEINFELD | WED | 03/19/99 | 21:30 | 22:00 | TVPG | DAILY | 856413 | George burns down cabin in... |
| 4 | CBS | JAG | WED | 03/19/99 | 19:00 | 20:00 | TVPG | WEEKLY | 125974 | An aircraft carrier in a no-fly zone... |
| 5 | ESPN | NHL DET. VS DAL. | WED | 03/19/99 | 18:00 | 22:30 | N/A | N/A | 981254 | Detroit visits Dallas in a chase... |
| 6 | HBO1 | TITANIC | WED | 03/19/99 | 16:00 | 19:30 | PG13 | WEEKLY | 00001 | Drama based on a true story... |
| 7 | DISCOVERY | LOST SHIPS | WED | 03/19/99 | 20:00 | 21:00 | TVG | WEEKLY | 00235 | Locating lost ships in the Atlantic... |
| 8 | CNN | MONEY | WED | 03/19/99 | 12:00 | 12:10 | N/A | HOURLY | 990319 | Stock Market Update |
| ... | ... | ... | ... | ... | ... | ... | ... | ... | ... | ... |

FIG - 4

VERIFIED SCHEDULING OF RECURRENT PROGRAM RECORDING OPERATIONS

CROSS REFERENCE TO RELATED APPLICATIONS

1. Field of the Invention

The present invention relates generally to computer systems for controlling the recordings of content from a media, more particularly, to methods, systems, software, user interfaces, and signals for selecting programs and determining whether to enable or perform a function based on program information associated with the selected program.

2. Background of the Invention

Program scheduling information is used extensively with TVs, VCRs, Convergence PCs, PC/TVs, and set top boxes for cable TVs to display scheduling information for a multitude of programs. Typically scheduling information is transmitted by a service to a receiver in one of the aforementioned systems. The scheduling information can be contained within a carrier signal and the carrier signal transmitted, or propagated, through several different mediums. For example, the signal could propagate through air until it is received by a local satellite dish, whereupon it is transferred through a fiber optic cable to one of the above systems. The scheduling information received by the one of the above systems typically contains information like a program name, day, date and time the program airs, the rating of the program, and even if the program is closed captioned for the hearing impaired. Additionally, the scheduling information could contain a summary describing the program and if the program is available with foreign language subtitles or any other information associated with the programs. The above information is available to the viewer using program scheduling information in conjunction with one of the above systems.

A common use of program scheduling information with one of the above systems is to select a program and further select a function associated with the program. Two common functions are the record and remind functions. The record function allows the user to record a program at a future date using the selected program's information contained within the program scheduling information (i.e., channel, date, time length, etc.). The remind function allows the user to be reminded of a program that is about to air using the program scheduling information. By selecting a program and a function associated with the program, the tasks of selecting, programming, or performing a function are greatly simplified.

As an example, suppose the user wanted to record a program that airs on a future date. The user would select a program and then select a record function to record the program. Upon selecting the record function, the record function will be automatically performed when the selected program airs on the future date. The task of recording a program is simplified in that the program scheduling information associated with the selected program is used to assist in performing the record function. The recording of a program is analogous to the method used in manually programming a VCR to record a program on a future date, except that all of the information required for programming the VCR is contained in the program scheduling information associated with the selected program and is automatically stored requiring minimal effort by the user. The remind function is similar to the record function except that when the selected program is about to air, the user would receive a reminder from the system instead of recording the program.

Similar to record and remind functions are periodic record and remind functions. Periodic record and remind functions are an extension of the record and remind functions with the added feature of being able to record or remind at different recurring periodic intervals (i.e. daily, weekly). These periodic recurring functions are useful for recording and reminding of programs that air on a daily or weekly basis. For example, suppose the user wanted to record the Seinfeld show that airs every Thursday on NBC (NBC and Seinfeld are copyrights of the National Broadcast Company). The user would record the Seinfeld show every week by first selecting the Seinfeld program and then selecting the weekly record function and would no longer have to set up the record or remind function every week for each Seinfeld program or show.

The periodic record or remind functions, as convenient as they may seem, can lead to unwanted recording and reminders of undesired programs. Unwanted recording or reminders occur when the user selects the periodic record or remind function for a program that does not recur periodically or does not have a matching recurring period of the selected function, and the periodic record or remind function is carried out regardless of whether the program recurs on an equivalent periodic basis. As an example, suppose the user wanted to record the National Football League's Super Bowl on the Sunday it airs. If the user selects the weekly record function in lieu of just a one-time record function to record the Super Bowl, the system would automatically record a plurality of programs, in addition to the Super Bowl, on a weekly basis until the function was terminated leading to an undesirable program recording state.

Recording or reminding of programs on a recurring periodic basis, without knowledge of the program's recurring period, can lead to a waste of resources used to perform a periodic record function. What is needed is a method, system, interface, software, and a signal for enabling a function based upon program scheduling information associated with a selected program such as for enabling a periodic function for a program that airs on an equivalent recurring periodic basis.

SUMMARY OF THE INVENTION

Accordingly, the present invention provides a method for a system using program scheduling information. The method comprising the steps of selecting a program from the program scheduling information, and enabling at least one parameter based upon program information associated with the selected program.

The present invention further provides a system comprising at least one processor, memory operably coupled to the processor, at least one bus operably coupled to the processor and the memory, a display configured to display a cursor, and a cursor control device configured to control the cursor displayed on the display. The system further comprises a user interface for presenting program scheduling information on the display and configured to select a program from the program scheduling information and enable at least one parameter based upon program information associated with the selected program.

The present invention further provides a computer readable medium tangibly embodying a program of instructions for a system using program scheduling information. The program of instructions implementing selecting a program from the program scheduling information, and enabling at least one parameter based upon program information associated with the selected program.

The present invention further provides a signal embodied in a propagation medium, for use in a system using program scheduling information. The signal comprising at least one instruction configured to select a program from the program scheduling information, and at least one instruction configured to enable at least one parameter based upon program information associated with the selected program.

It is an object of the present invention to provide a solution for preventing the selection or performance of periodically recurring functions for programs which are not periodically recurring or do not have matching recurrence periods.

The present invention provides the advantage of preventing the scheduling of periodic record and remind functions for programs that are not recurring periodic programs or do not have recurrence periods matching the recurrence periods of the functions, thus eliminating nonsensical weekly record and remind events.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 3 illustrates a graphical user interface according to a preferred embodiment of the present invention.

FIG. 3C illustrates a display window containing a function menu according to a preferred embodiment of the present invention.

FIG. 4 is an illustration of program information stored within an Electronic Program database according to one embodiment of the present invention.

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
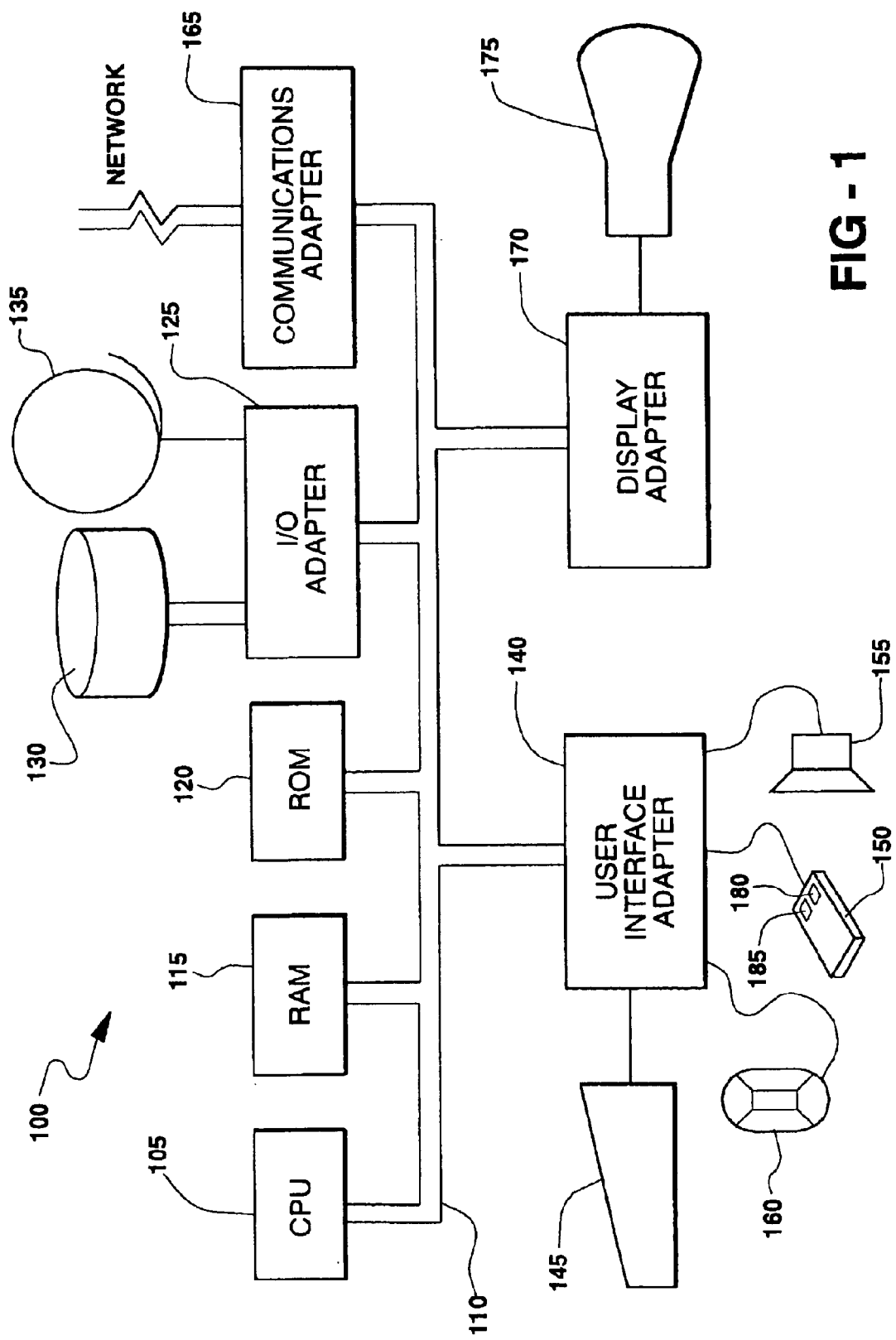
FIG. 1 illustrates a detailed block diagram showing a computer system according to a preferred embodiment of the present invention.

A representative hardware environment for practicing the present invention is depicted in FIG. 1 which illustrates a typical hardware configuration of an Information Handling System (IHS) 100 in accordance with the present invention. IHS 100 has a central processing unit 105 such as a conventional microprocessor and a number of other units interconnected via at least one system bus 110. IHS 100 may be, for example, a portable or desktop Gateway computer or a Gateway Destination system (Gateway and Destination are trademarks of Gateway 2000, Inc.). IHS 100 includes random access memory (RAM) 115, read-only memory (ROM) 120, and input/output (I/O) adapter 125 for connecting peripheral devices such as disk units 130 and tape drives 135 to system bus 110. IHS 100 additionally includes a user interface adapter 140 for connecting keyboard 145, mouse 150, speaker 155, microphone 160, and/or other user interface devices to system bus 110. A communications adapter 165 for connecting IHS 100 to information sources which comprise an information network such as the Internet and display adapter 170 for connecting system bus 110 to a display device such as monitor 175 are also provided. Mouse 150 has a first button 180 and at least a second button 185. First button 180 and second button 185 can be utilized to control and select features utilizing a cursor (not shown) displayable on monitor 175.

Figure 2:
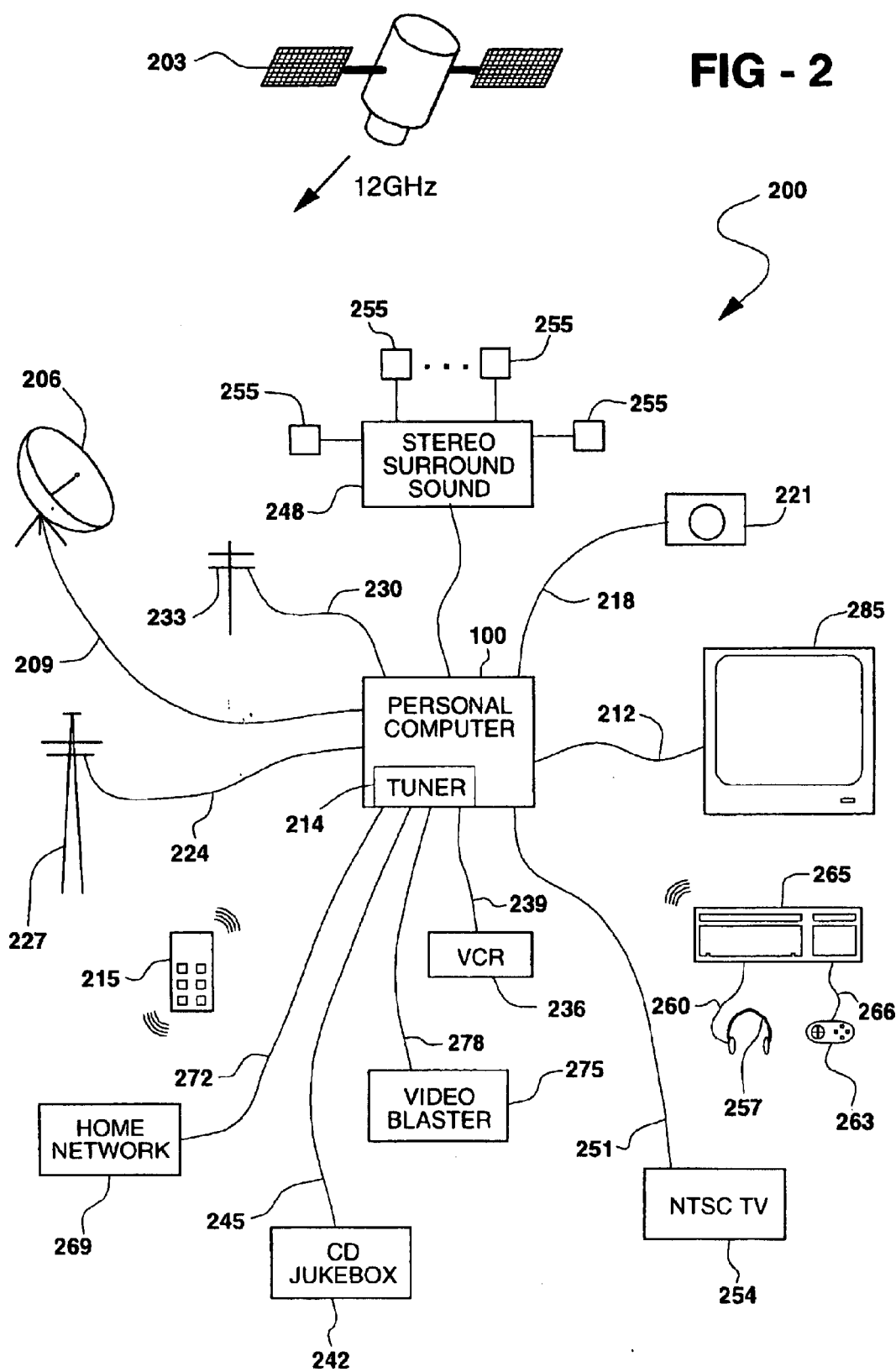
FIG. 2 illustrates a detailed block diagram showing a convergence system according to the preferred embodiment of the present invention.

Referring next to FIG. 2, an integrated home entertainment network or convergence system such as the Gateway Destination System® mentioned above is shown generally at 200. Reference numerals or letters in FIG. 2 which are like, similar, or identical to the reference numerals or letters of FIG. 1 indicate like, similar, or identical components or features. External to convergence system 200 is satellite 203 which, in one preferred embodiment, is a HS601 model operated by Hughes Inc. at a 101 degree west longitude geosynchronous orbital location and transmits signals comprising 150 channels of modulated digital video, audio, and data at a frequency of about 12 GHz. The satellite signals are received by convergence system 200 through antenna 206 containing a low noise block converter amplifier. Antenna 206 is preferably about 18 inches in diameter and receives left- and right-hand circularly polarized signals between 12.2 and 12.7 GHz. Antenna 206 provides a "downconverted-spectrum" signal between 950 and 1450 MHZ via coaxial cable 209 or other suitable communication medium to information handling system 100, such as a personal computer or other system or circuitry capable of processing information. Suitable antennas are manufactured and sold by RCA Corporation® via direct sales and through numerous major retail chains such as Radio Shack®.

Information handling system 100 contains circuitry and software to further process signals from satellite dish 206, generally demodulating and decoding the signal to produce a VGA compatible (video graphics adapter) signal. The VGA output is provided via standard VGA-compatible monitor cable 212 to drive large screen data quality monitor 285 which is suitable for viewing in a family room or entertainment room environment. Information handling system 100 provides for user input by means of first remote control 215 and second or auxiliary remote control 265. Remote control 215 comprises a hand-held size device with standard television controls and a numeric keypad and, in one embodiment, controls for a VCR (video cassette recorder) Remote control 215 provides RF (radio frequency) or IR (infrared) control signals for communication with information handling system 100.

Auxiliary remote control 265 can provide a full functionality personal computer keyboard with additional standard television and VCR controls and a pointing device which is preferably in the form of a touchpad. Auxiliary remote control 265 can also provides RF communication between information handling system 100. RF communication is preferred because RF control allows remote control receiver of information handling system 100 to be in a different room from, for example monitor 285. Therefore, RF communications allow a user to control components within convergence system 200 without having a clear line of sight to the unit receiving input.

In another embodiment, IR control signals can be utilized because of the IR standard circuitry are available at a low cost. Monitor cable 212 can be a standard type cable typically used on VGA display devices and can be comprised of several electrical conductors interfacing with monitor 285 in a D-series shell connector. In one embodiment, full multi-media sourcing and accessing of audio/video/data (A/V/D) broadcast is further provided.

Information handling system 100 may include tuner circuitry 214 capable of tuning multiple channels and receiving television information or signals compatible with NTSC (National Television Standards Committee) or PAL (Phase Alteration Line) forms from any medium such as from a cable system or from a digital satellite system. One embodiment of the signal on coaxial cable 209 from satellite dish 206 provides digital A/V/D signals from such sources as DirecTV or Primestar (DirecTV is a trademark of DirecTV, Inc., and Primestar is a trademark of Primestar Partners, L.P.). In another such embodiment, the signal on coaxial cable 209 provides analog A/V such as a NTSC compatible antenna signals.

In another such embodiment, the signal on camera cable 218 from camera 221 can provide analog A/V such as NTSC audio/video signals. In further embodiments, the signal on cable-data source cable 224 from cable-data source 227 provides analog and/or digital A/V/D. In further such embodiments, the signal on PSTN (Public Switched Telephone Network) cable 230 from PSTN 233 provides data or phone signals such as ISDN (integrated services digital network) or POTS (plain old telephone system) signals. In one set of such embodiments, information handling system 100 is programmed to automatically record analog signals such as television programming onto recordable media such as a videotape in VCR 236 coupled to cable 239. In another such set of embodiments, information handling system 100 is programmed to automatically record digital signals such as digital television programming or CD-ROM (Compact Disk—Read Only Memory) type audio onto recordable media such as recordable CDs in CD jukebox 242 coupled to cable 245. CD jukebox 242 can also play CDs or CD-ROMs for use elsewhere. In another such embodiment, signals are sent to stereo surround sound system 248 for audio output to one or more speakers 255 and on NTSC TV cable 251 to NTSC TV 254. In one embodiment, earphones 257 on earphones' cable 260 and gamepad 263 on gamepad cable 266 provide additional input/output using auxiliary remote control 265. Home network 269 is "smart wiring" used to communicate with the users home, coupled by home network cable 272 to information handling system 100. Videoblaster 275 provides video signal processing utilizing videoblaster cable/connector 278. In one embodiment, cables used within IHS 100 and/or convergence system 200 may be coupled using wiring, IR communications, or RF communications or any combination thereof.

One example of convergence system 200 is the Destination System using the DestiVu user interface manufactured and sold by Gateway 2000, Inc. Convergence system 200 is a fully functional computer integrated with a television (via broadcast, cable, satellite, VCR, digital disk, or other broadcast media) and also provides personal computing functionality. This convergence of computer and television enables a user the combined access to both television programs and information as well as computer related functionality such as computer information, programs, and Internet access.

Although many of today's televisions employ much of the same hardware resources employed by computers such as information handling system 100, it is possible that the present invention might be practiced in other electronic devices or in networked electronic devices. For example, with the development of audio/video networking such as the recently proposed HAVi (Home Audio/Visual interoperability) standard, television sets or other audio/video devices such as audio/video receivers and VCRs that do not themselves contain such resources could implement the present invention by utilizing the resources of other devices on a communication network.

Referring now to FIG. 3, an illustration of a Graphical User Interface according to a preferred embodiment of the present invention is shown, wherein reference numerals or letters which are identical to reference numerals or letters in FIG. 1–2 indicate like, similar, or identical components or features. FIG. 3 illustrates a detailed view of an operating system's GUI as displayed on display device 175 in accordance with the present invention. The operating system shown in FIG. 3 is DestiVu by Gateway Inc., but the present invention will work with Windows 95, Windows 98 (Windows 98, Windows 98 are trademarks of Microsoft Corporation), or any other GUI. GUI 38 includes cursor 32, desktop 40, two icons 41,42, window 31a with schedule 33 displaying program information, window 31b displaying additional program information 36, window 31c displaying function menu 39, and dialog box 31d displaying user dialog 37 with user response prompts 34, 35 all of which are well known in the art.

In a preferred embodiment of the present invention, a method is deployed by system 100 that prevents inadvertent scheduling of events. For example, a user can select a program and further select a parameter such as a function to be used in association with the program. In one embodiment a parameter includes functions that can be preferred by IHS 100. Parameters or functions that have recurrence periods that are equal to the recurrence period of a selected program are enabled for the user to select. For example, if a user selected a program that airs on a weekly basis, then weekly functions, such as weekly record or weekly remind functions, would be enabled for the user to select. Therefore, system 100 determines the recurrence periods of parameters or functions and the recurrence periods the programs. Upon comparing the recurrence periods, the present invention enables the functions with equal recurrence periods.

Likewise, the present invention disables the functions with recurrence periods not equal to the recurrence period of the selected program.

FIGS. 3A–E are illustrations of windows displayed within GUI 38 and are displayed using display device 175. FIGS. 3A–E are one representation of displaying windows within GUI 38 where the windows may be configured in a plurality of ways, with the underlying functionality and information displayed by the windows remaining intact.

Figure 3A:
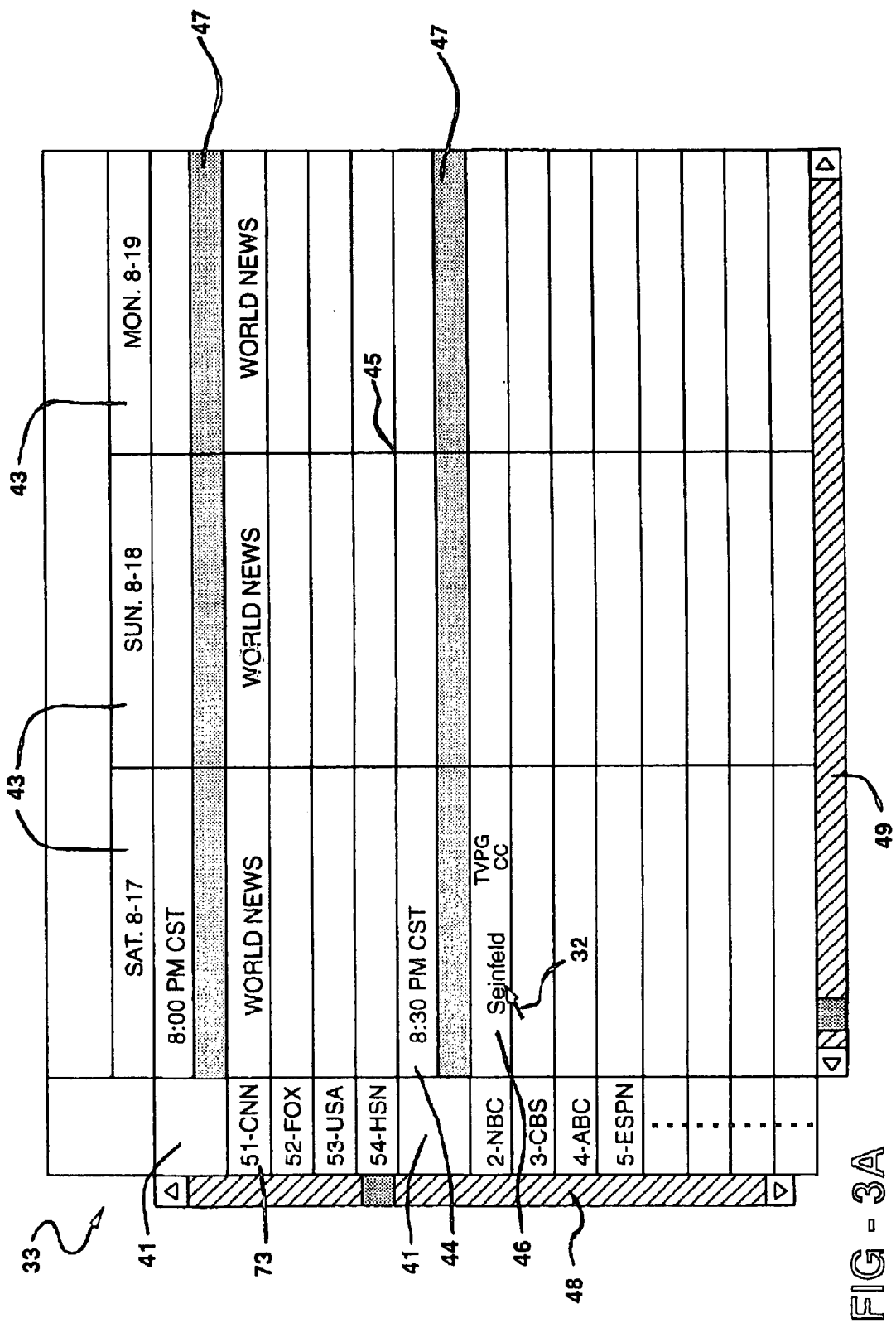
FIG. 3A illustrates a schedule according to a preferred embodiment of the present invention.

Referring now to FIG. 3A, an illustration of a schedule with program information according to one embodiment of the present invention, wherein reference numerals or letters which are identical to reference numerals or letters in FIG. 1–3 indicate like, similar, or identical components or features. FIG. 3A is an illustration of a schedule displaying program scheduling information. In one embodiment of the present invention, Schedule 33 is configured to be an electronic program guide. Schedule 33 includes a grid 45 configured to display the program scheduling information and includes channel and network name 73 for each of the programs on the left hand side of grid 45, with the days and dates of the week 43 being displayed on the top row of grid 45. Grid 45 also includes program name 46 and associated program information such as ratings, closed captions, etc. Grid 45 includes a mini-header 47 separating each time slot 44 within grid 45 for the networks displayed. Vertical and horizontal scroll bars 48, 49 are used to access the information within grid 45. For example, if the user wanted to display program information for Saturday, August 17 at 8:30 P.M., the user would use mouse 150 and mouse buttons 180, 185 to move cursor 32 in a manner to scroll the vertical and horizontal scroll bars until the desired information is displayed. It can be appreciated by those skilled in the art that the schedule 33 and information displayed therein may be organized in a plurality of ways to effectively display the program scheduling information. The organization of the information displayed within schedule 33 is done not in a limiting sense, but in a manner to show one representation of displaying program scheduling information.

Figure 3B:
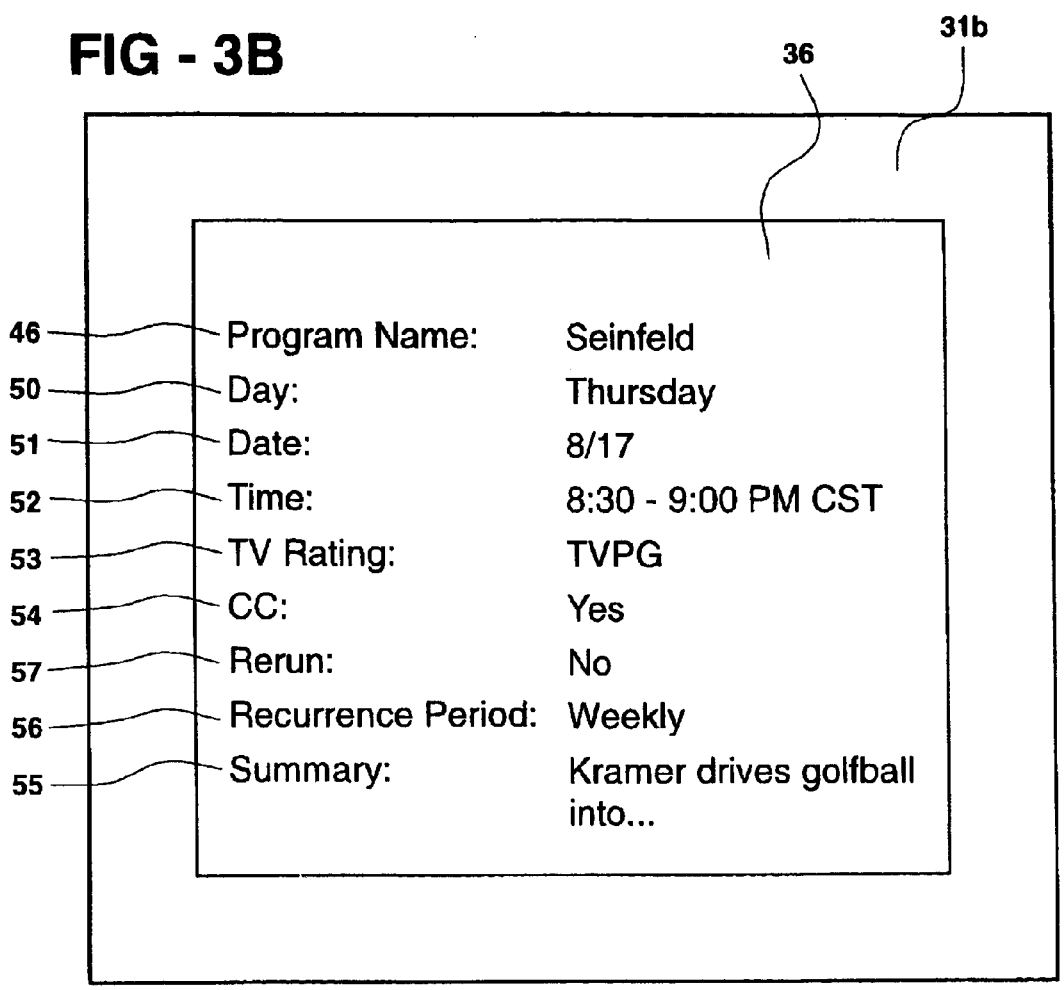
FIG. 3B illustrates a display window containing program information according to a preferred embodiment of the present invention.

FIG. 3A illustrates cursor 32 pointing to program name 46 such that cursor 32 may be used to select program name 46. Selecting program name 46 provides additional program information illustrated by FIG. 3B. FIG. 3B is an illustration of additional program information according to a preferred embodiment of the present invention, wherein reference numerals or letters which are identical to reference numerals or letters in FIGS. 1–3, 3A indicate like, similar, or identical components or features.

Program information 36 displayed in window 31b of GUI 38 includes program name 46, day 50, date 51, and time 52, of when program name 46 airs. Additional information shown is program rating 53, whether the program is closed captioned for the hearing impaired 54, and a brief summary 55 describing the episode of program name 46. Also included is whether program name 46 has already aired once, making it a rerun 57, and recurrence period 56 of program name 46 such as once, daily, weekly, or any periodic interval.

The example shown in FIG. 3B is the Seinfeld program that airs on a weekly basis and thus has a "weekly" reference for recurs field 56. A program that recurs on a daily basis would include a "daily" reference, and a program that airs one time would have a "once" reference for recurrence period 46 field. The above information illustrated in FIG. 3B is displayed using a separate window in GUI 38 but in other embodiments the information may be configured to be displayed within windows already existing on GUI 38 such as window 31a of FIG. 3. Alternatively, the information can be displayed within grid 45 of schedule 33 upon selecting program name 46 using cursor 32. Program information may be displayed in many different ways without departing from the scope of the present invention.

Referring next to FIG. 3C, an illustration of a function menu according to the preferred embodiment of the present invention is shown, wherein reference numerals or letters which are identical to reference numerals or letters in FIG. 1–3, 3A–B indicate like, similar, or identical components or features. FIG. 3C is an illustration of a function menu displayed within window 31c of GUI 38.

Function menu 39 includes header 65 with record and remind title bars 60, 61 to describe the functions within function menu 39. A record function is a function that allows the user to program a recording of a selected program name 46 using the program scheduling information associated with a selected program as displayed by FIGS. 3A–B. A remind function utilizes program scheduling information associated with a selected program to have a reminder sent to the user that a selected program is about to air. A reminder can be an audible tone, an email, a user prompt, or even the replaying of a pre-recorded message played by a player internal to information handling system 100 and played by a program contained within Windows 95 or any other type of operating system.

The set of functions displayed within function menu 39 are associated with the function titles in header 65 to include record or remind once 62a, 62b, daily record or remind 63a, 63b, and weekly record or remind 64a, 64b. The recurrence periods of each of the functions is illustrated by the names of the functions. For instance, weekly remind function 64b has a recurrence period of one week, and daily record function 63a has a recurrence period of 24 hours. Additionally, record and remind once functions 62a, 62b have no recurrence period as they are performed only one time. FIG. 3C is one graphical representation of function menu 39 of the preferred embodiment of the present invention and in other embodiments may be organized in a plurality of ways such as horizontally (not shown) or through the use of a pull down function menu (not shown), all of which are well known in the art.

Figure 3D:
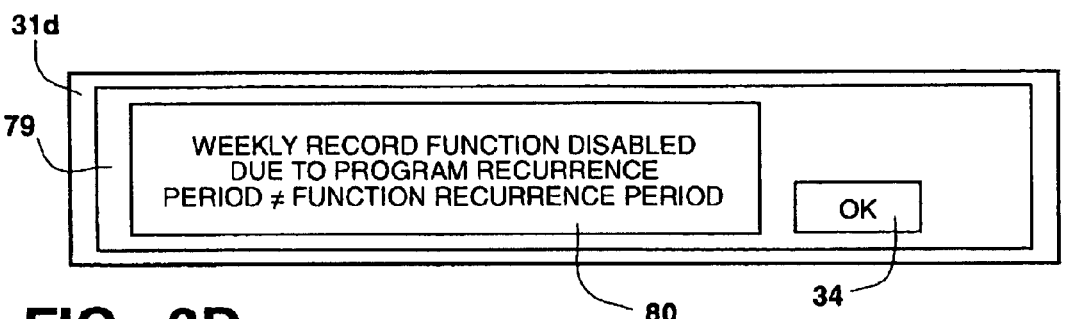
FIG. 3D illustrates a dialog box containing a notice according to a preferred embodiment of the present invention.

Referring now to FIG. 3D, an illustration of a window displaying a dialog box according to a preferred embodiment of the present invention is shown wherein reference numerals or letters which are identical to reference numerals or letters in FIGS. 1–3, 3A–C indicate like, similar, or identical components or features. In FIG. 3D, dialog box 31d is displayed within GUI 38. Dialog box 31d displays a notice 79 with a message 80 stating that a function has been disabled due to the recurrence period of the function not being equal to the recurrence period of the selected program. In another embodiment, message 80 can be a reminder to the user of system 100 that a selected program is about to air. In either case, dialog box 31d is configured to have a user response prompt 34 for the user to acknowledge the information displayed within dialog box 31d.

Figure 3E:
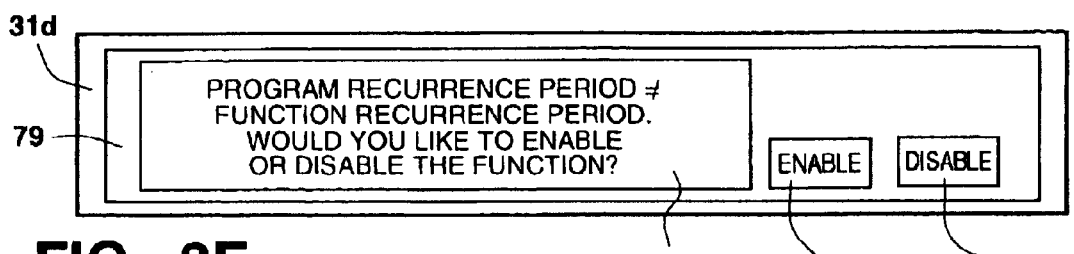
FIG. 3E illustrates another dialog box containing a notice according to a preferred embodiment of the present invention.

Referring now to FIG. 3E, an illustration of a window display a dialog box according to a preferred embodiment of the present invention is shown, wherein reference numerals or letters which are identical to reference numerals or letters in FIGS. 1–3, 3A–D indicate like, similar, or identical components or features. FIG. 3E is an illustration of another dialog box 79 with message 81 informing a user that the recurrence period of a program does not equal the recurrence period of a function. The user response prompts, in this instance, allow the user to acknowledge the differences in recurrence periods and either disable the function by selecting the "disable" user response prompt 72, enable the function by selecting the "enable" user response prompt 71. Configuration of dialog boxes are well known in the art. FIG. 3D and FIG. 3E are not shown in a limiting sense but to illustrate displaying of dialog boxes.

Referring next to FIG. 4, an illustration of program information stored within an EPG database according to a preferred embodiment of the present invention is shown, wherein reference numerals or letters which are identical to reference numerals or letters in FIGS. 1–3, 3A–E indicate like, similar, or identical components or features. FIG. 4 is a graphical representation of an Electronic Program Guide database. The information illustrated in FIG. 4 is shown generally by EPG database 400 and can be configured in a plurality of ways. Additionally, FIG. 4 is one illustration of program information within an Electronic Program Guide database. The information stored within EPG database 400 can be stored in any format known in the art of storing information within databases.

The information is stored in EPG database 400 can be acquired from any source or any combination of sources. For example, the information stored in EPG database 400 can be acquired through periodic downloads from a cable service provider. In another embodiment, the information stored in EPG database 400 can be acquired by tuning into a certain frequency that transmits program information to be stored within EPG database 400. In another embodiment the information stored in EPG database 400 can be acquired by recognizing programs that recur on a periodic basis and identify a program as a recurring program.

EPG database 400 illustrated in FIG. 4 includes header 415 used to illustrate the types of information that can be stored with an EPG database 400. Header 400 may, or may not, be included in EPG database 400 and is shown only to illustrate the types of program information stored within EPG database 400. The program information can consist of a plurality of types of information associated with a program. Such information can include channels 401, networks 402, program names 403, days 405, dates 406, start times 407, stop times 408, and ratings 409. Database 400 can also contain whether programs recur 410, episode numbers 411, and episode descriptions 412. Additional types of program information may be added to EPG database 400 without departing from the true spirit and scope of the present invention. EPG database 400 is one illustration of program information and contents contained therein and is not shown in a limiting sense, but as one example of program information stored within an Electronic Program Guide database.

Figure 5:
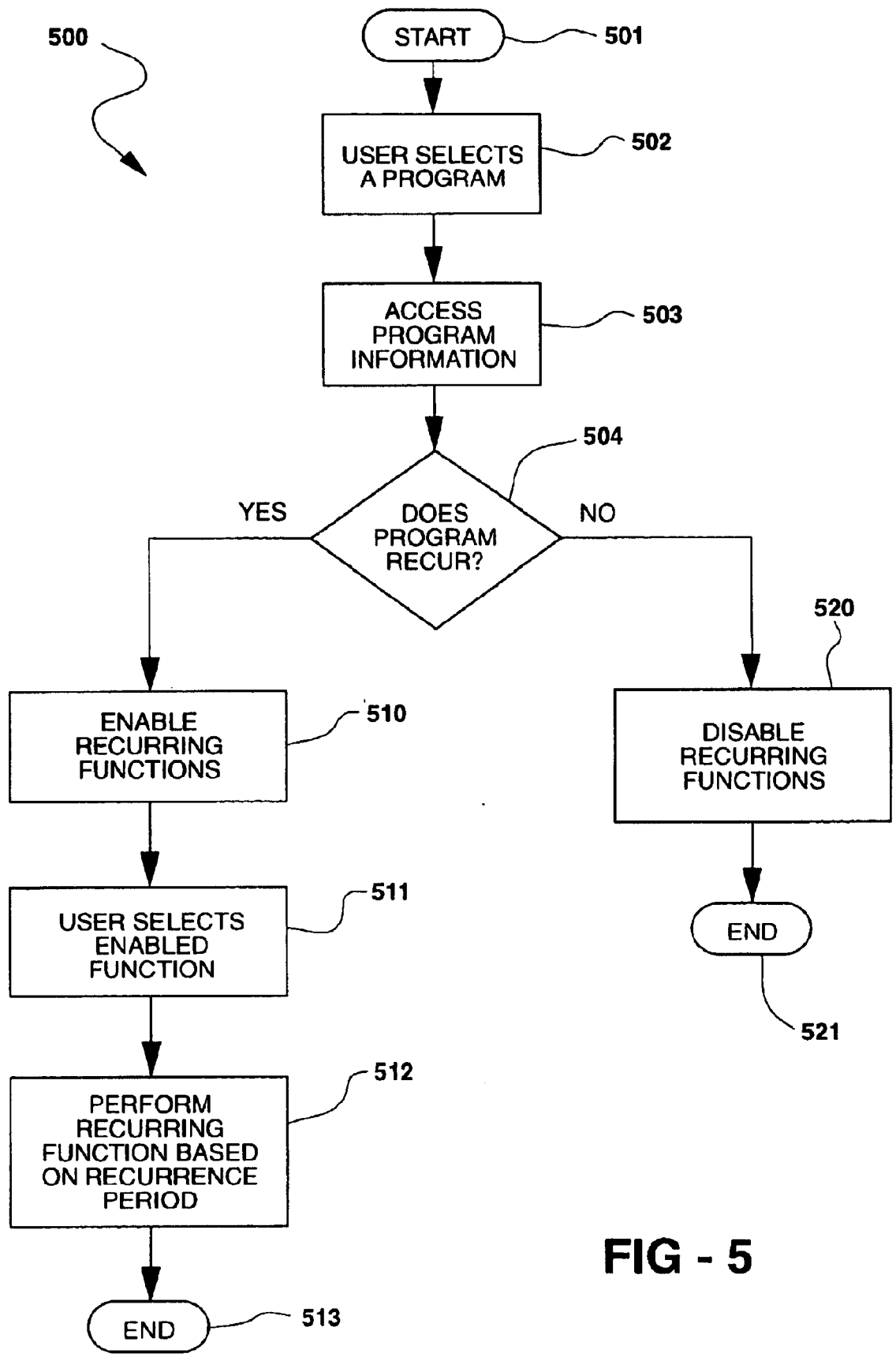
FIG. 5 is an illustration of a method of identifying recurring programs and functions according to one embodiment of the present invention.

Referring next to FIG. 5, an illustration of a method of enabling functions according to a preferred embodiment of the present invention. Reference numerals or letters which are identical to reference numerals or letters in FIGS. 1–4 indicate like, similar, or identical components or features. Method 500 as illustrated in FIG. 5 begins at block 501. At block 502 a user selects a program to be used in association with a function. The user can select a program in many ways. In one embodiment, a user can select a program using Schedule 33 illustrated in FIG. 3A. In another embodiment, a user may select a program by tuning NTSC TV 254 of FIG. 2 to a network or channel displaying a program.

Upon selecting a program, the method proceeds to block 503 where the method accesses program information associated with the selected program. Program information associated with a selected program may be configured in many ways. In one embodiment, program information can be stored within a database such as EPG database 400 of FIG. 4. In another embodiment, program information can be stored in a database remote to IHS 100.

Upon accessing the program information associated with the selected program, the method proceeds to block 504 where the method determines if the selected program recurs. For example, program information associated with the selected program may contain a recurs parameter such as recurs 410 illustrated in FIG. 4. Therefore if a program recurs on a weekly basis a recurs parameter would include a value that relates to a weekly recurrence period such as "weekly." In another embodiment of the present invention, the accessed program information associated with the selected program may not include a recurs parameter but may include program information for determining whether a program recurs. For example, EPG database 400 may include several entries for the same program on the same network. The program information for the selected program can therefore be used to determine if the program recurs on the same channel, in the same time slot, at a recurring interval. The present invention can identify if a program recurs on a periodic interval in a plurality of ways without departing from scope of the invention.

Upon identifying that a program recurs on a periodic basis, method 500 proceeds from block 504 to block 510. At block 510, the method enables only those parameters or functions that recur on the same periodic basis as the selected program of block 502. For example, if the program recurs on a daily periodic basis, only daily recurring functions (i.e., daily record, daily remind, etc.) are enabled. The method then proceeds to block 511 where a user selects one of the enabled functions. For example, if a user wanted to record a weekly airing program, the user would select a weekly record function to be used in association with the selected program.

Upon selecting a function to be used in association with the selected program, the method then proceeds to block 512 where the selected function is performed. For example, if a user selected a daily recurring program and decided to record the program using a daily record function, the daily record function would be performed on a daily basis using the program information associated with the selected program. In one embodiment, the method would proceed to perform a recurring function until the program no longer recurs or the user terminates the function. Upon terminating or canceling the function, the method proceeds to block 512 where the method ends.

Alternatively, at block 504 if the selected program of block 502 does not recur, the method proceeds to block 520 where the recurring functions (i.e., daily, weekly, etc.) are disabled. The method then proceeds to block 521 where the method ends.

Figure 6:
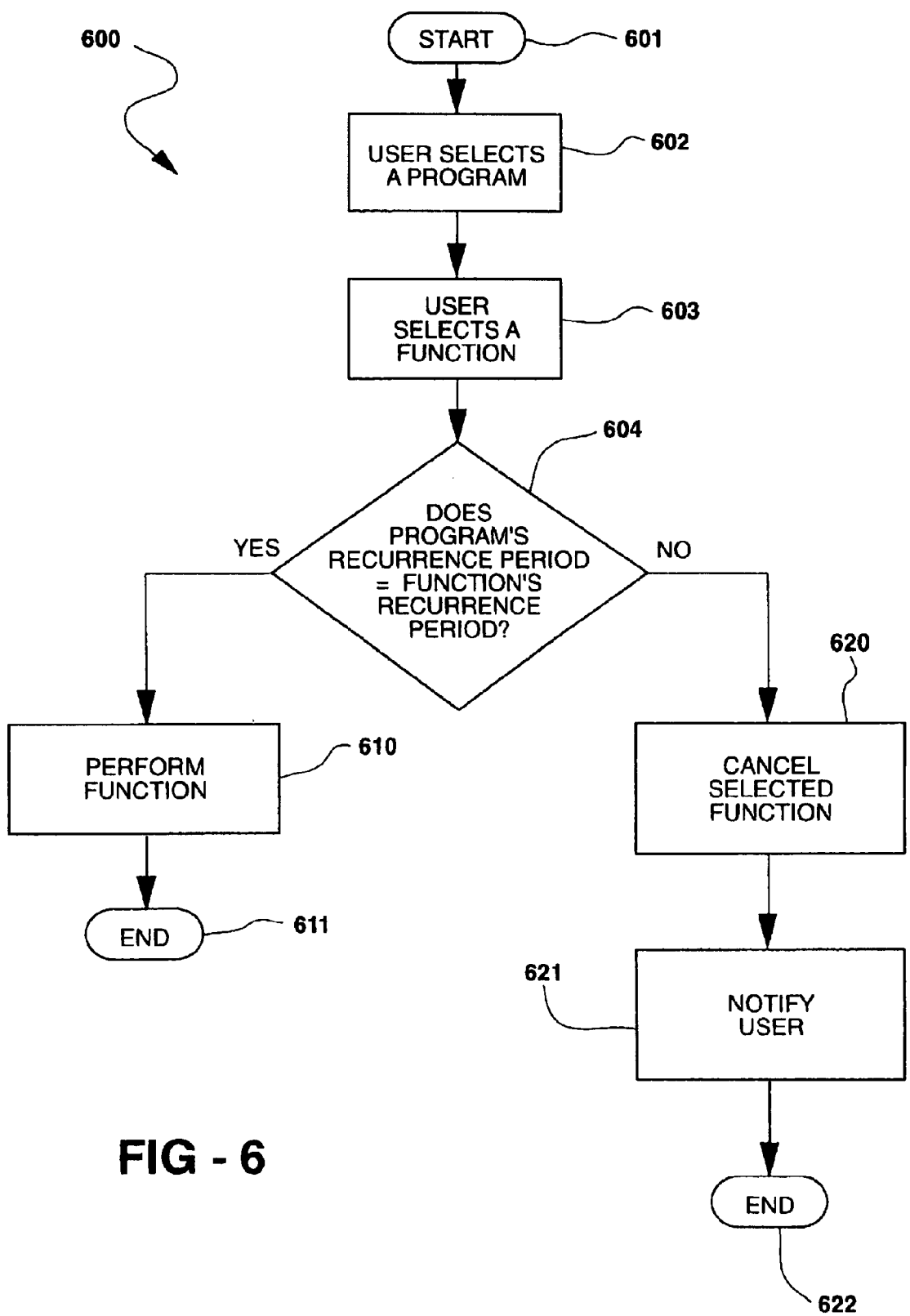
FIG. 6 is an illustration of a method of performing functions according to a preferred embodiment of the present invention.

Referring next to FIG. 6, an illustration of a method of verifying recurrence information according to a preferred embodiment of the present invention is shown, wherein reference numerals or letters which are identical to reference numerals or letters in FIGS. 1–5 indicate like, similar, or identical components or features. Method 600 is used to identify if a selected program's recurrence period is equal to a selected function's recurrence period prior to performing the selected function. For example, when a user selects a program and further selects a function to be used in association with the program, the recurrence period for each will be verified prior to performing the function.

Method 600 beings at block 601. At block 602 a user selects a program to be used in association with a function or parameter. The user can select a program using Schedule 33 illustrated in FIG. 3. In another embodiment, the user can select a program by tuning into a particular network or channel broadcasting the program. The user can select a program in many ways where selection of a program should not be viewed as limiting factor of the present invention.

The method then proceeds to block 603 where the user selects a function (i.e., daily record, remind once, weekly record, etc.) to be used in association with the selected program. Upon selecting a function the method proceeds to block 604 where the selected program's recurrence period is compared to the function's recurrence period. For example, a weekly recurring program and a weekly recurring function would have equal recurrence periods. Upon verifying that the recurrence periods are equal, the method proceeds to block 610 where the selected function is performed. In one embodiment, a selected function, such as a record function, is performed by tuning into a particular channel on a particular day and recording the selected program using the program information (i.e., the start times, stop times, etc.) of the selected program. Upon performing the function, the method then proceeds to block 611 where the method ends.

Alternatively, at block 604 if the recurrence period for the selected program does not equal the recurrence period for the selected function, the method proceeds to block 620 where the selected function is canceled. Additionally, the method proceeds to block 621 where a notice such as notice 79 illustrated in FIG. 3D or FIG. 3E is sent to a user indicating that the selected function has been canceled. The method then proceeds to block 622 where the method ends.

In one embodiment of the present invention, system 100 can verify if a program is stored within system 100 prior to enabling a function. For example, a user may not be aware that a selected program is stored within CD/DVD jukebox 242. Therefore, system 100 can verify that a copy of the program does not exist prior to enabling, for example, a record function. In another embodiment, the episode number of a program can be stored within system 100 annotating that a particular episode of a program has been recorded. One skilled in the art can appreciate that a plurality of methods can be deployed to verify if a program is stored within system 100 prior to enabling a function without departing from the scope of the present invention.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–6. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog and/or digital signal, embodied in a propagation medium and transmitted over the propagation medium by a user. The propagation medium may include a local area network or a wide area network, such as the Internet, or other propagation medium. The signal may be propagated through an air medium and transmitted/received by a satellite, antenna, or other device and transferred from/to the computer or information handling system of the preferred embodiment. The signal may be a composite signal comprising a carrier signal carrying the desired information, such as at least one computer program instruction, implementing the invention which may be downloaded when desired by the user. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

I claim:

1. A method, for a system using program scheduling information for recording of content, said method comprising the steps of: selecting a program from the program scheduling information; determining a recurrence period for the selected program from the program information associated with the selected program; and enabling at least one parameter relating to recur functionality when said selected program is a recurring program, said enabling step including comparing the recurrence period for the selected program to a recurrence period for the at least one parameter.

2. The method, as recited in claim 1, further includes disabling the at least one parameter if the recurrence period for the selected program does not equal the recurrence period for the at least one parameter.

3. The method, as recited in claim 1, further includes notifying a user that the recurrence period for the selected program does not equal the recurrence period for the at least one parameter.

4. The method, as recited in claim 1, wherein the program information includes a recurrence period.

5. The method, as recited in claim 1, wherein said at least one parameter relating to recur functionality includes periodic record and periodic remind.

6. A system for recording content, comprising: at least one processor; memory operably coupled to said processor; at least one bus operably coupled to said processor and said memory; a display configured to display a cursor and a cursor control device configured to control said cursor displayed on said display; and a user interface for presenting program scheduling information on said display configured to select a program from said program scheduling information, determine a recurrence period for the selected program from the program information associated with the selected program and enable at least one parameter relating to recur functionality when the selected program is a recurring program, and compare the recurrence period for said selected program to a recurrence period for said at least one parameter.

7. The system, as defined in claim 6, wherein said user interface is further configured to disable said at least one parameter if the recurrence period for said selected program does not equal the recurrence period for said at least one parameter.

8. The system, as defined in claim 6, wherein said user interface is further configured to notify a user that the recurrence period for said selected program does not equal the recurrence period for aid at least one parameter.

9. The system, as recited in claim 6, wherein said program information includes a recurrence period.

10. The system, as defined in claim 6, wherein said at least one parameter relating to recur functionality includes periodic record and periodic remind.

11. A computer readable medium tangibly embodying a program of instructions, for a system using program scheduling information for recording content, said program of instructions implementing the following: selecting a program from the program scheduling information; determining a recurrence period for the selected program from the program information associated with the selected program; and enabling at least one parameter relating to recur functionality when the selected program is a recurring program, said enabling step includes comparing the recurrence period for the selected program to a recurrence period for the at least one parameter.

12. The computer readable medium, as recited in claim 11, further includes disabling at least one parameter if the recurrence period for the selected program does not equal the recurrence period for the at least one parameter.

13. The computer readable medium, as recited in claim 11, further includes notifying a user that the recurrence period for the selected program does not equal the recurrence period for the at least one parameter.

14. The computer readable medium, as recited in claim 11, wherein the program information includes a recurrence period.

15. The computer readable medium, as recited in claim 11, wherein said at least one parameter relating to recur functionality includes periodic record and periodic remind.

\* \* \* \* \*